United States Patent
Liu et al.

(10) Patent No.: US 11,229,011 B2
(45) Date of Patent: Jan. 18, 2022

(54) METHOD AND APPARATUS FOR MANAGING RESOURCES IN COMMUNICATION SYSTEM

(71) Applicants: Alcatel Lucent, Nozay (FR); Nokia Solutions and Networks Oy, Espoo (FI)

(72) Inventors: Yong Liu, Shanghai (CN); Liyu Cai, Shanghai (CN); Torsten Wildschek, Gloucestershire (GB)

(73) Assignees: Nokia Solutions and Networks Oy, Espoo (FI); Alcatel Lucent, Nozay (FR)

( * ) Notice: Subject to any disclaimer, the term of this patent is extended or adjusted under 35 U.S.C. 154(b) by 0 days.

(21) Appl. No.: 16/323,396

(22) PCT Filed: Jul. 25, 2017

(86) PCT No.: PCT/IB2017/001103
§ 371 (c)(1),
(2) Date: Feb. 5, 2019

(87) PCT Pub. No.: WO2018/029528
PCT Pub. Date: Feb. 15, 2018

(65) Prior Publication Data
US 2021/0289472 A1    Sep. 16, 2021

(30) Foreign Application Priority Data
Aug. 11, 2016 (CN) .......................... 201610657202.2

(51) Int. Cl.
*H04W 72/02* (2009.01)
*H04W 72/04* (2009.01)
*H04W 4/40* (2018.01)

(52) U.S. Cl.
CPC .............. *H04W 72/02* (2013.01); *H04W 4/40* (2018.02); *H04W 72/0406* (2013.01); *H04W 72/0446* (2013.01)

(58) Field of Classification Search
CPC .............. H04W 4/40–48; H04W 8/20; H04W 36/0072; H04W 72/02; H04W 72/0406; H04W 72/0413–0433; H04W 72/0446
See application file for complete search history.

(56) References Cited

U.S. PATENT DOCUMENTS 10,051,636 B2 *   8/2018   Zeng ................. H04W 72/0486
10,285,180 B2 *   5/2019   Zeng ..................... H04W 28/26
(Continued)

FOREIGN PATENT DOCUMENTS

CN    102026292 A    4/2011
CN    104427617 A    3/2015
(Continued)

OTHER PUBLICATIONS

ZTE, "SA and Data Resource Selection for D2D Communication Mode 2," 3$^{rd}$ Generation Partnership Project (3GPP), 3GPP TSG-RAN WG1 Meeting #78, R1-143138, 3 pages, XP050788616, Dresden, Germany, Aug. 18-22, 2014.
(Continued)

*Primary Examiner* — Thomas R Cairns
(74) *Attorney, Agent, or Firm* — Fay Sharpe LLP (57) ABSTRACT

Embodiments of the present disclosure provide a communication method and apparatus. For example, at a first device, a resource for data transmission is randomly selected, and the resource is used to transmit data. In addition, the first device sends, to a second device, an indication that the first device will continue to use the resource for transmitting further data. A corresponding apparatus is further disclosed in the present disclosure.

14 Claims, 5 Drawing Sheets

(56) References Cited

U.S. PATENT DOCUMENTS

| | | | |
|---|---|---|---|
| 10,869,318 B2* | 12/2020 | Feng | H04W 4/44 |
| 2012/0045012 A1 | 2/2012 | Alapuranen | |
| 2016/0150391 A1 | 5/2016 | Lee et al. | |

FOREIGN PATENT DOCUMENTS

| | | |
|---|---|---|
| WO | 2015021185 A1 | 2/2015 |
| WO | WO 2016/021963 A1 | 2/2016 |

OTHER PUBLICATIONS

Ericsson, "Discussion on P2x-x2P," $3^{rd}$ Generation Partnership Project (3GPP), 3GPP TSG-RAD WG1 Meeting #85, R1-165275, 3 pages, XP051089789, Nanjing, People's Republic of China, May 23-27, 2016.

International Search Report for PCT/IB2017/001103 dated Nov. 22, 2017.

3GPP TR 36.885 V2.0.0, 3rd Generation Partnership Project; Technical Specification Group Radio Access Network; Study on LTE-based V2X Services; (Release Jun. 14, 2016).

PCT Patent Application No. PCT/IB2017/001103, Written Opinion of the International Searching Authority, dated Nov. 22, 2017, 7 pages.

R1-165276, 3GPP TSG RAN WG1 Meeting #84bis, Busan, South Korea, Apr. 11-15, 2016, "Discussion on V2X PC5 Scheduling, Resource Pools and Resource Patterns", 8 pages.

R1-165967, 3GPP TSG RAN WG1 Meeting #85, Nanjing, China, May 23-27, 2016, "3GPP TR 36.885 v.2.0.0 Study on LTE-based V2X Services", 221 pages.

English Bibliography for Chinese Pat. App. Publication No. CN102026292A, published Apr. 20, 2011, printed from Derwent Innovation on Nov. 29, 2021, 5 pages.

English Bibliography for Chinese Pat. App. Publication No. CN104427617A, published Mar. 18, 2015, printed from Derwent Innovation on Nov. 29, 2021, 5 pages.

* cited by examiner

METHOD AND APPARATUS FOR MANAGING RESOURCES IN COMMUNICATION SYSTEM

FIELD

Embodiments of the present disclosure generally relate to a communication method and apparatus, and more specifically to a method and apparatus for managing resources in a communication system.

BACKGROUND

The study of LTE-based V2X services is carried out in 3GPP (the $3^{rd}$ Generation Partnership Project) to explore the opportunity to realize the "connected cars" for the vehicle industry based on the widely deployed LTE networks. The LTE-based V2X communication includes V2V (vehicle-to-vehicle) communication, V2P (vehicle-to-pedestrian) communication and V2I/N (vehicle-to-infrastructure/network) communication. V2P communication is expected to improve road safety for pedestrians. However, currently there is not a power efficient and effective solution for use in V2P communication.

SUMMARY

Generally, embodiments of the present disclosure provide a method and apparatus for managing resources in a communication system.

According to a first aspect of the present disclosure, there is provided a communication method. The method comprises: randomly selecting, at a first device, a resource for data transmission; transmitting data using the resource; and sending, to a second device, an indication that the first device will continue to use the resource for transmitting further data.

According to a second aspect of the present disclosure, there is provided a communication method. The method comprises: receiving, at a second device and from a first device transmitting data using a randomly selected resource, an indication that the first device will continue to use the resource for transmitting further data; and selecting, based on the indication, a resource for data transmission of the second device.

According to a third aspect of the present disclosure, there is provided an electronic device. The electronic device comprises a controller configured to randomly select a resource for data transmission; a transceiver configured to: transmit data using the resource; and send, to a further electronic device, an indication that the electronic device will continue to use the resource for transmitting further data.

According to a fourth aspect of the present disclosure, there is provided an electronic device. The electronic device comprises: a transceiver configured to receive, from a further electronic device transmitting data using a randomly selected resource, an indication that the further electronic device will continue to use the resource for transmitting further data; and a controller configured to select, based on the indication, a resource for data transmission of the electronic device.

It will be appreciated from the following description that according to embodiments of the present disclosure, a first device may randomly select a resource for data transmission, and use the resource to transmit data. In addition, the first device may further send, to a second device, an indication that the first device will continue to use the resource for transmitting further data. Correspondingly, the second device may receive, from the first device, the indication that the first device will continue to use the resource for transmitting further data. Then, the second device selects, based on the indication, a resource for data transmission of the second device. Therefore, mutual interference of communication of the first device and second device can be reduced, and power consumption of the first device can be saved, thereby improving system performance.

It will be appreciated that this Summary does not intend to indicate key or essential features of embodiments of the present disclosure or to limit the scope of the present disclosure. Other features of the present disclosure will become apparent by the following description.

BRIEF DESCRIPTION OF THE DRAWINGS

Through the following detailed description with reference to the accompanying drawings, the above and other features, advantages and aspects of example embodiments of the present disclosure will become more apparent. In the drawings, identical or similar reference numbers represent the same or similar elements, in which.

DETAILED DESCRIPTION OF EMBODIMENTS

Embodiments of the present disclosure will be described with reference to the drawings in more detail. Though some embodiments of the present disclosure are shown in the drawings, it should be appreciated that the present disclosure can be implemented in various manners and should not be interpreted as being limited to the implementations described herein. Conversely, these embodiments are provided for a more thorough and complete understanding of the present disclosure. It is to be understood that the drawings and embodiments of the present disclosure are only for example purpose, rather than limiting the protection scope of the present disclosure.

The term "network equipment" used herein refers to a base station or other entities or nodes having a specific function in a communication network. "Base station (BS)" may represent a node B (NodeB or NB), an evolved node B (eNodeB or eNB), a remote radio unit (RRU), a radio-frequency head (RH), a remote radio head (RRH), a relay, or a low power node such as a femto base station, a pico base station and the like. In the context of the present disclosure, for ease of discussion, the terms "network equipment" and "base station" may be used interchangeably, and the eNB may be used as an example network equipment.

The term "terminal equipment" or "user equipment (UE)" used therein refers to any terminal device that can perform wireless communication with base stations or with each other. For example, the terminal equipment may include a mobile terminal (MT), a subscriber station (SS), a portable subscriber station (PSS), a mobile station (MS), or an access terminal (AT) and the above devices mounted on vehicles. In the context of the present disclosure, for ease of discussion, the terms "terminal equipment" and "user equipment" may be used interchangeably.

As used herein, the term "includes" and its variants are to be read as open-ended terms that mean "includes, but is not limited to." The term "based on" is to be read as "based at least in part on." The term "one embodiment" is to be read as "at least one embodiment," and the term "another embodiment" is to be read as "at least one another embodiment." Relevant definition for other terms will be given in the following depiction.

As to V2P/P2V (pedestrian-to-vehicle) communication performed with PC5 air interface, although V2P/P2V communication is expected to improve road safety for pedestrians, the user equipment of a pedestrian usually has power consumption limitation and coexistence of V2V and V2P/P2V communication causes mutual interference. Currently, as to V2P/P2V communication, there is a solution in which both vehicle UEs and pedestrian UEs perform sensing-based resource selection for data transmission. However, this solution is not power efficient for pedestrian UEs. There is another solution in which vehicle UEs perform sensing-based resource selection for V2V data transmission, and pedestrian UEs perform random resource selection for P2V data transmission. However, in this solution, the performance of P2V communication is degraded due to coexistence of V2V and P2V communication unless the resource pools for V2V and P2V are disjoint.

To solve these and other potential problems, embodiments of the present disclosure provide a communication method. According to this method, the user equipment (hereinafter referred to as "first device") may randomly select a resource for data transmission, and transmit data using the resource. Meanwhile, the first device may compare the number of times of the resource being used for data transmission with a predetermined threshold, to determine whether to continue to transmit data using the resource or randomly re-select a new resource. In addition, the first device may further send, to the vehicle equipment (hereinafter referred to as "second device"), an indication that the first device will continue to use the resource for transmitting further data. Correspondingly, the second device may receive, from the first device, the indication that the first device will continue to use the resource for transmitting further data. Then, the second device may select, based on the indication, a resource for data transmission of the second device.

In this way, the first device may combine random resource selection and semi-persistent communication to randomly select the resource for data transmission upon performing resource selection, and use the same resource to transmit data for a plurality of times upon data transmission. In addition, since the second device receives, from the first device, the indication that the first device will continue to use the same resource for transmitting further data, the second device may, upon executing resource selection, take into account the resource allocation information of the first device to avoid using the resource occupied by the first device as much as possible. Hence, mutual interference of communication of the first device and second device can be reduced, and power consumption of the first device can be saved, thereby improving system performance.

Figure 1:
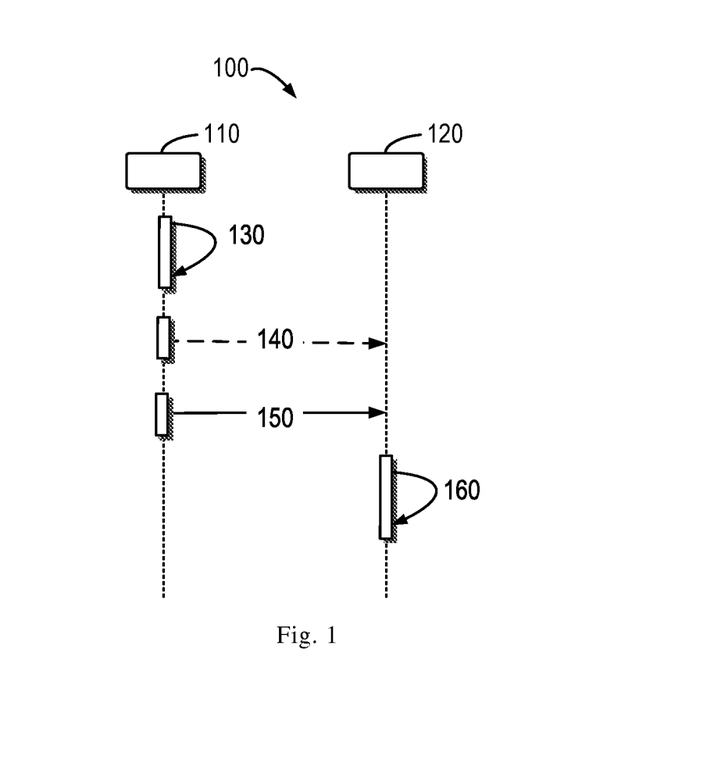
FIG. 1 illustrates a schematic diagram of a process of a first device transmitting data in association with a second device according to an embodiment of the present disclosure.

FIG. 1 illustrates a schematic diagram 100 of a process 100 of a first device 110 transmitting data in association with a second device 120 according to an embodiment of the present disclosure. The first device 110 may be user equipment of a pedestrian, and the second device 120 may be vehicle equipment. The first and second devices 110 and 120 may for example be a notebook computer, a tablet computer, a smart phone, a personal digital assistant, a reader, an audio player, a camera or the like, and the types of the first and second devices 110 and 120 do not constitute limitation to the embodiments of the present disclosure.

As shown in FIG. 1, at the first device 110, a resource for data transmission may be randomly selected (130). The first device 110 may use the selected resource to transmit (140) data. In some embodiments, the first device 110 may use the selected resource to transmit (140) data to the second device 120. In other embodiments, the first device 110 may use the selected resource to transmit (140) data to other devices. In addition, the first device 10 may further send (150), to the second device 120, an indication that the first device will continue to use the same resource for transmitting further data. In some embodiments, the first device 110 may simultaneously transmit (140) the data and send (150) the indication. In other embodiments, the first device 110 may transmit (140) the data after sending (150) the indication. The sequence of transmitting (140) the data and sending (150) the indication does not constitute limitation to the embodiments of the present disclosure.

At the second device 120, the indication that the first device will continue to use the same resource for transmitting further data may be received from the first device. The second device 120 may select (160), based on the indication, a resource for data transmission of the second device 120. For example, the second device 120 may use the resource used by the first device 110 as indicated as input information of resource selection algorithm of the second device 120.

As stated above, in this example, the first device may perform random resource selection to save power consumption of the first device. The second device may avoid using the resource occupied by the first device as much as possible upon performing resource selection. Hence, mutual interference of communication of the first device and second device can be reduced, and power consumption of the first device can be saved, thereby improving system performance.

Figure 2:
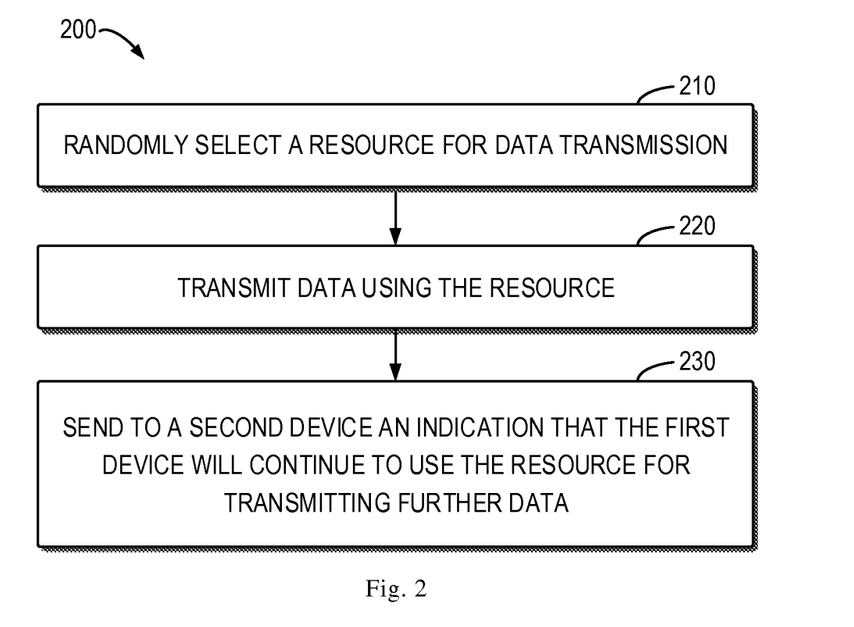
FIG. 2 illustrates a flowchart of a communication process or method implemented at the first device according to an embodiment of the present disclosure.

Principles and specific embodiments of the present disclosure will be described in detail respectively from perspective of the first device 110 and second device 120 with reference to FIG. 2 to FIG. 5. First, referring to FIG. 2, FIG. 2 illustrates a flowchart of a communication process or method 200 implemented at the first device 110 according to an embodiment of the present disclosure.

As shown, at 210, the first device 110 may randomly select a resource for data transmission from a resource pool. For example, the first device 110 may randomly select a subframe for data transmission from the resource pool, and then randomly select a frequency resource in the subframe for data transmission. In some embodiments, since the first device 110 performs random resource selection instead of performing sensing-based resource selection, a data reception function of the first device 110 can be disabled to save power. In this case, for example only communication from the first device 110 to the second device 120 in P2V communication is enabled.

Figure 4:
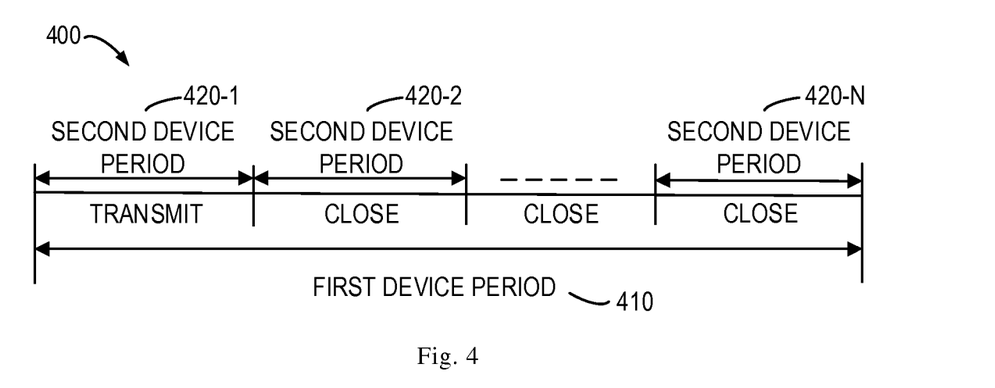
FIG. 4 illustrates a schematic diagram of a frame structure according to an embodiment of the present disclosure.

At 220, the first device 110 may use the selected resource to transmit data. The frame structure that the first device 110 uses the selected resource to transmit the data will be described with reference to FIG. 4. As shown in FIG. 4, usually, a data transmission period (for example, 1 s) of the first device 110 may be larger than a data transmission period (for example, 100 ms) of the second device 120. Hereinafter, the data transmission period of the first device 110 may be referred to as a first device period 410, and the data transmission period of the second device 120 may be referred to as a second device period 420. In some embodiments, the first device period 410 may be a multiple of the second device period 420. In some embodiments, the first device 110 may select transmission subframes (for example, subframes in the first 100 ms) to meet for example 100 ms latency requirement. In some embodiments, the first device 110 may remain closed or silent in the remaining duration (for example, a duration in the first device period 410 corresponding to the second device periods 420-2 to 420-N) in the first device period 410 to save the power consumption of the first device.

At 230, the first device 110 may transmit, to the second device 120, an indication that the first device 110 will continue to use the same resource for transmitting further data, for example, an indication that the first device 110 will continue to use the resource at the same position in the first device period 410 for transmitting further data. In some embodiments, the first device 110 may send the indication in a control channel.

Figure 3:
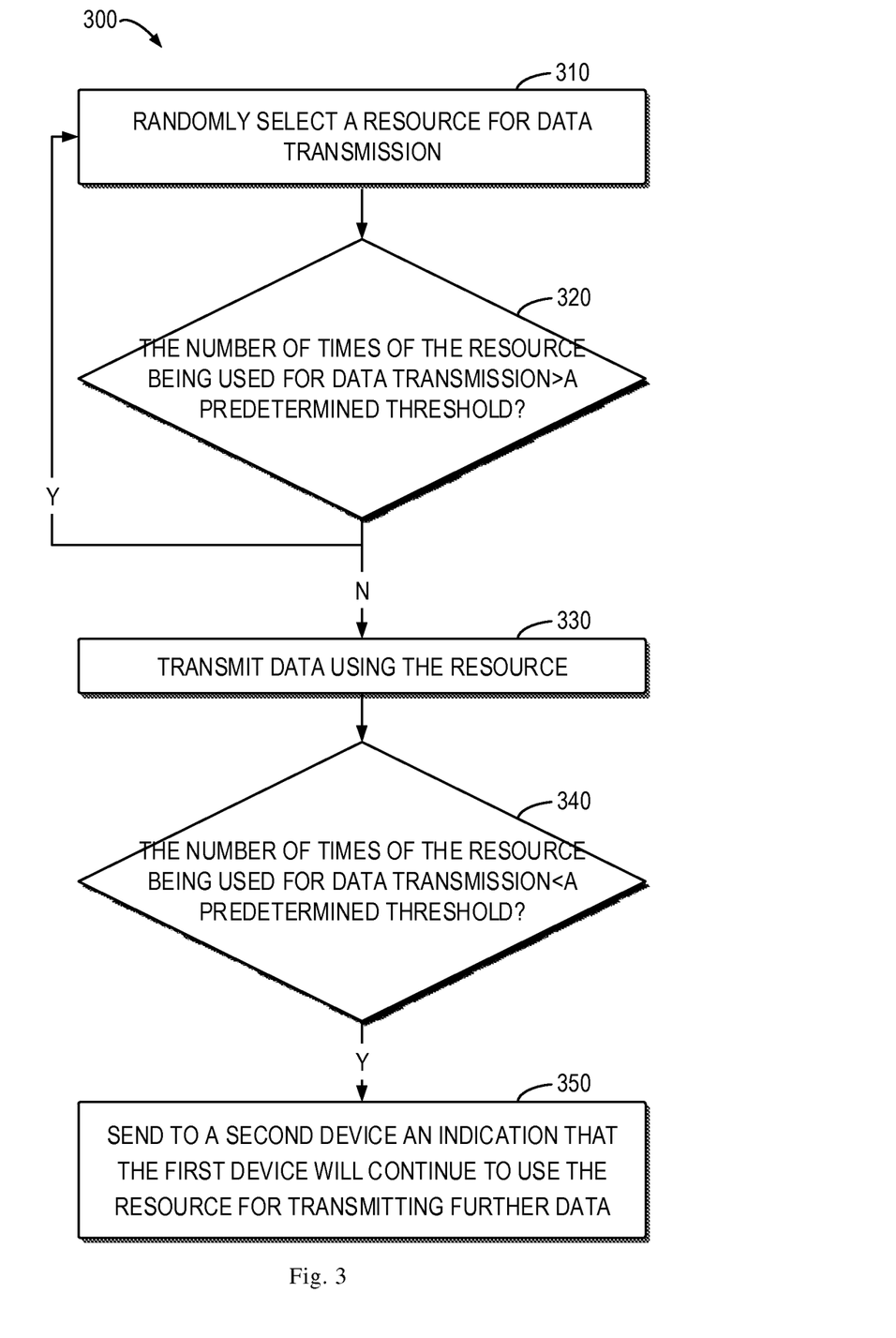
FIG. 3 illustrates a flowchart of another communication process or method implemented at the first device according to an embodiment of the present disclosure.

An example of the process 200 will be described with reference to FIG. 3. FIG. 3 illustrates a flowchart of a communication process or method 300 implemented at the first device according to an embodiment of the present disclosure.

As shown, at 310, as stated at 210, the first device 110 may randomly select the resource for data transmission from a resource pool. At 320, the first device 110 may compare the number of times of the selected resource being used for data transmission with a predetermined threshold. In some embodiments, the first device 110 may set a counter to count the number of times of the selected resource being used for data transmission, and compare the counter value with the predetermined threshold. The predetermined threshold may be randomly selected or predetermined. For example, an initial value of the counter may be set as 0, and the predetermined threshold may be set as 9.

If the number of times of the selected resource being used for data transmission is below the predetermined threshold, at 330, as stated at 220, the first device 110 may use the selected resource to transmit data. For example, if the number of times of the selected resource being used for data transmission as indicated by the counter value is below 9, for example, the counter value is 3, the first device 110 may continue to use the resource at the same position in the first device period 410 to transmit data. After the first device period 410, the counter value may increment by 1 to count the data transmission. The way that the counter value changes is not limited to increment, but may also be decrement or any other suitable ways. The way that the counter value changes does not constitute limitation to the embodiments of the present disclosure.

If the number of times of the selected resource being used for data transmission exceeds the predetermined threshold, the flow returns to 310, at which the first device 110 randomly re-selects a new resource for data transmission. For example, if the number of times of the selected resource being used for data transmission as indicated by the counter value exceeds 9, for example, the counter value is 10, the first device 110 may randomly re-select a resource in the first device period 410 for data transmission, and the counter value may be reset.

At 340, the first device 110 may further compare the number of times of the selected resource being used for data transmission with the predetermined threshold. If the number of times of the selected resource being used for data transmission is smaller than the predetermined threshold, at 350, as stated at 230, the first device 110 may send, to the second device 120, an indication that the first device 110 will continue to use the same resource for transmitting further data. For example, if the number of times of the selected resource being used for data transmission as indicated by the counter value is smaller than 9, for example, the counter value is 8, the first device 110 may send, to the second device 120, an indication that the first device 110 will continue to use the resource at the same position in the first device period 410 for transmitting further data.

If the number of times of the selected resource being used for data transmission is not smaller than the predetermined threshold, the first device 110 does not send, to the second device 120, the indication that the first device 110 will continue to use the same resource for transmitting further data. For example, if the number of times of the selected resource being used for data transmission as indicated by the counter value is not smaller than 9, for example, the counter value is 9, the first device 110 does not send, to the second device 120, the indication that the first device 110 will continue to use the resource at the same position in the first device period 410 for transmitting further data.

It may be appreciated that the order of the actions in the process 300 does not constitute limitation to the embodiments of the present disclosure. In some embodiments, actions 330 and 350 may be performed simultaneously. In particular, the data may be transmitted and the indication may be sent in the same message. In other embodiments, action 330 may be performed after action 350.

In this way, the first device 110 may, upon performing resource selection, randomly select the resource for data transmission, thereby saving the power consumption of the first device. In addition, the first device 110 may, upon data transmission, use the same resource to transmit data for a plurality of times, thereby improving the overall system performance.

The communication process implemented at the first device 110 is described above with reference to FIG. 2 to FIG. 4. Next, a corresponding communication process 500 implemented at the second device 120 will be described with reference to FIG. 5.

Figure 5:
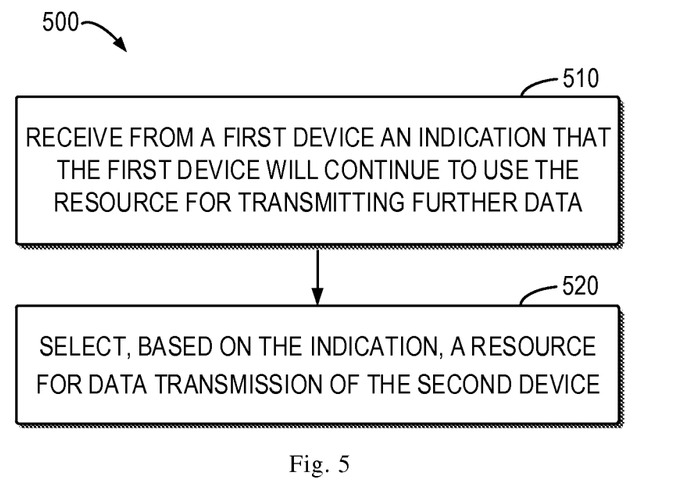
FIG. 5 illustrates a flowchart of a communication process or method implemented at the second device according to an embodiment of the present disclosure.

At 510, the second device 120 may receive, from the first device 110 transmitting data using a randomly selected resource, the indication that the first device 110 will continue to use the same resource for transmitting further data. Then, at 520, the second device 120 may select, based on the indication, a resource for data transmission of the second device 120. For example, the second device 120 may receive, from the first device 110, the indication that the first device 110 will continue to use the resource at the same position in the first device period 410 for transmitting further data. The second device 120 may select, based on the indication, a resource for data transmission of the second device 120 in the second device period 420-1.

In this way, since the second device receives, from the first device, the indication that the first device will continue to use the same resource for transmitting further data, the second device may, upon performing resource selection, take into account the resource allocation information of the first device to avoid using the resource occupied by the first device as much as possible. Hence, mutual interference of communication of the first device and second device can be reduced, thereby improving system performance.

It should be appreciated that the operations and relevant features performed by the first device 110 described above with reference to FIG. 2 to FIG. 4 also apply to the second device 120, and the operations and relevant features performed by the second device 120 described above with reference to FIG. 5 also apply to the first device 110, and have the same effects. Details are omitted here.

Figure 6:
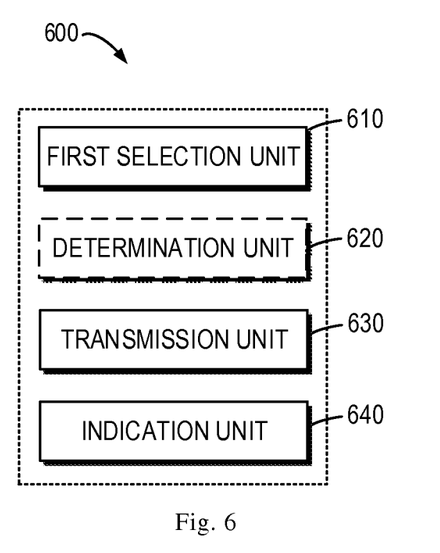
FIG. 6 illustrates a block diagram of an apparatus for implementing a communication process or method implemented at the first device according to an embodiment of the present disclosure.

FIG. 6 illustrates a block diagram of an apparatus 600 for implementing a communication process 200 implemented at the first device 110 according to an embodiment of the present disclosure. As shown, the apparatus 600 may include a first selection unit 610, a transmission unit 630 and an indication unit 640. In some embodiments, the apparatus 600 may further include an optional determination unit 620.

The first selection unit 610 may be configured to randomly select a resource for data transmission. The determination unit 620 may be configured to compare the number of times of the selected resource being used for data transmission with a predetermined threshold. In some embodiments, the first selection unit 610 may be configured to, in response to the number of times of the selected resource being used for data transmission exceeding the predetermined threshold, randomly re-select a new resource for data transmission.

The transmission unit 630 may be configured to use the selected resource to transmit data. In some embodiments, the transmission unit 630 may be configured to, in response to the number of times of the selected resource being used for data transmission being below the predetermined threshold, use the selected resource to transmit data.

The indication unit 640 may be configured to send, to the second device 120, an indication that the first device 110 will continue to use the selected resource for transmitting further data. In some embodiments, the indication unit 640 may be configured to, in response to the number of times of the selected resource being used for data transmission being smaller than the predetermined threshold, send the indication to the second device 120.

Figure 7:
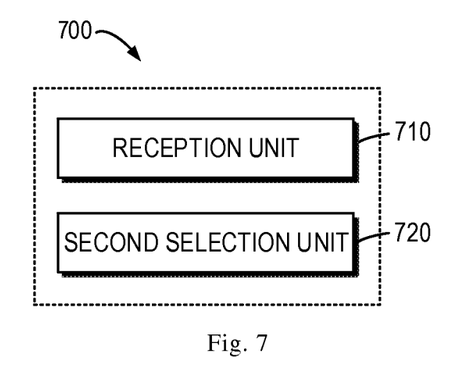
FIG. 7 illustrates a block diagram of an apparatus for implementing a communication process or method implemented at the second device according to an embodiment of the present disclosure.

FIG. 7 illustrates a block diagram of an apparatus 700 for implementing a communication process 500 implemented at the second device 120 according to an embodiment of the present disclosure. As shown, the apparatus 700 may include a reception unit 710 and a second selection unit 720.

The reception unit 710 may be configured to receive, from the first device 110, the indication that the first device 110 will continue to use the selected resource for transmitting further data. The second selection unit 720 may be configured to select, based on the indication received by the reception unit 710, a resource for data transmission of the second device 120.

It should be appreciated that each unit in the apparatus 600 and apparatus 700 respectively corresponds to each action in the process 200 to 500 described with reference to FIG. 2 to FIG. 5. Hence, the operations and features described above with reference to FIG. 2 to FIG. 5 also apply to the apparatus 600 and apparatus 700 and units included therein, and have the same effects. Details are omitted here.

The units included in the apparatus 600 and apparatus 700 may be implemented in various ways, including software, hardware, firmware and any combination thereof. In an embodiment, one or more units may be implemented using software and/or firmware, for example, machine-executable instructions stored in a storage medium. In addition to the machine-executable instructions or as an alternative, all or part of the units in the apparatus 600 and apparatus 700 may be at least partially implemented by one or more hardware logic components. By way of an example, and not limitation, the example types of hardware logic components that can be used comprise programmable field gate array (FPGA), application specific integrated circuit (ASIC), application specific standard product (ASSP), system on chip (SOC), complex programmable logic device (CPLD) and so on.

These units shown in FIG. 6 and FIG. 7 may be partially or totally implemented as hardware modules, software modules, firmware modules and any combinations thereof. In particular, in some embodiments, the flows, methods or processes described above may be implemented by hardware in the user equipment or the vehicle equipment. For example, the user equipment or the vehicle equipment may use its transmitter, receiver, transceiver and/or processor or controller to implement the method 200 and the method 500.

Figure 8:
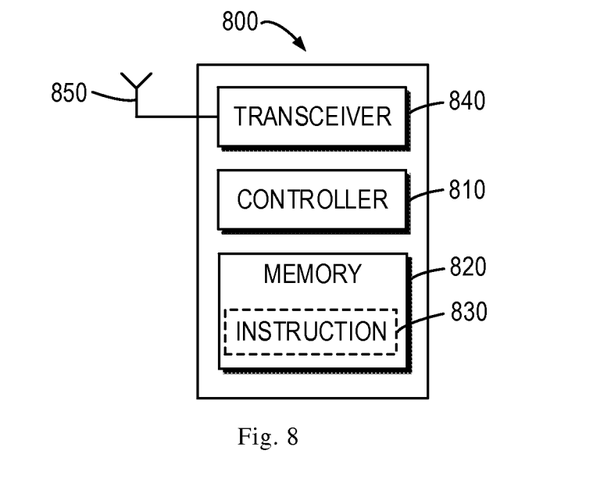
FIG. 8 illustrates a block diagram of an electronic device suitable for implementing an embodiment of the present disclosure.

FIG. 8 illustrates a block diagram of an electronic device 800 suitable for implementing an embodiment of the present disclosure. The electronic device 800 may be used to implement the user equipment, for example, the first device 110 shown in FIG. 1; and/or used to implement the vehicle equipment, for example, the second device 120 shown in FIG. 1.

As shown, the electronic device 800 comprises a controller 810. The controller 810 controls operations and functions of the electronic device 800. For example, in some embodiments, the controller 810 may perform various operations via instructions 830 stored in a memory 820 coupled thereto. The memory 820 may be of any type suitable for local technical environment, and may be implemented using any suitable data storage technology, including but not limited to a storage device based on a semiconductor, a magnetic storage device and system, and an optical storage device and system. Although FIG. 8 only shows one memory unit, the electronic device 800 may include a plurality of physically different memory units.

The controller 810 may be of any type suitable for local technical environment, and may include but not limited to one or more of a general-purpose computer, a dedicated computer, a microcontroller, a digital signal processor (DSP) and a controller-based multi-core controller architecture. The electronic device 800 may also include a plurality of controllers 810. The controller 810 is coupled to a transceiver 840, and the transceiver 840 may implement reception and transmission of information via one or more antennas 850 and/or other components.

When the electronic device 800 serves as the first device 110, the controller 810 and the transceiver 840 may operate in cooperation to implement the process 200 and/or 300 described with reference to FIG. 2 and/or FIG. 3. When the electronic device 800 serves as the second device 120, the controller 810 and transceiver 840 may operate in cooperation to implement the process 500 described with reference to FIG. 5. For example, in some embodiments, all actions involving reception and transmission of data/information described above may be performed by the transceiver 840, and other actions may be performed by the controller 810. All features described above with reference to FIG. 2, FIG. 3 and FIG. 5 apply to the electronic device 800. Details are omitted here.

Generally, various example embodiments of the present disclosure may be implemented in hardware or application-specific circuit, software, logic, or in any combination thereof. Some aspects may be implemented in hardware, while the other aspects may be implemented in firmware or software that may be executed by a controller, a microprocessor or other computing device. When various aspects of the present invention are illustrated or described as block diagrams, flowcharts, or other graphical representations, it would be appreciated that the block diagrams, apparatus, system, technique or method described herein may be implemented, as non-restrictive examples, in hardware, software, firmware, application-specific circuit or logic, general purpose hardware or controller or other computing device, or some combinations thereof.

For example, the embodiments of the present disclosure can be described in a context of machine-executable instructions which are included, for instance, in the program module executed in the device on a target real or virtual processer. Generally, a program module includes routine, program, library, object, class, component, data structure, and the like, and performs a particular task or implements a particular abstract data structure. In the embodiments, the functions of the program modules can be combined or divided among the described program modules. The machine-executable instructions for the program module can be executed in a local or distributed device. In the distributed device, the program module can be located both in the local and remote storage mediums.

The computer program code for implementing the method of the present disclosure may be written in one or more programming languages. These computer program codes may be provided to a general-purpose computer, a dedicated computer or a processor of other programmable data processing apparatus, such that when the program codes are executed by the computer or other programmable data processing apparatus, the functions/operations specified in the flowchart and/or block diagram are caused to be implemented. The program code may be executed completely on a computer, partially on a computer, as an independent software packet, partially on a computer and partially on a remote computer, or completely on a remote computer or server.

In the context of the present disclosure, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium includes, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

Besides, although the operations are described in a particular sequence, it should not be understood that such operations are carried out in a particular sequence as shown or in a successive sequence, or all shown operations are performed so as to achieve a desired result. In some cases, multi-task or parallel-processing would be advantageous. Likewise, although the above discussion includes some specific implementation details, they should not be explained as limiting the scope of any invention or claims, but should be explained as a description for a particular embodiment of a particular invention. In this description, some features described in the context of separate embodiments may also be integrated into a single embodiment. On the contrary, various features described in the context of a single embodiment may also be separately implemented in a plurality of embodiments or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:
1. A communication method, comprising:
randomly selecting, at a first device, a resource for data transmission from a resource pool;
transmitting data using the resource;
sending, to a second device, an indication that the first device will continue to use the resource for transmitting further data; and
comparing a number of times the resource is being used for data transmission with a predetermined threshold.
2. The method according to claim 1, further comprising:
in response to the number of times exceeding the predetermined threshold, randomly re-selecting a new resource for data transmission.
3. The method according to claim 1, wherein transmitting the data using the resource comprises:
in response to the number of times being below the predetermined threshold, transmitting the data using the resource.
4. The method according to claim 1, wherein sending the indication comprises:
sending the indication in a control channel.
5. The method according to claim 1, wherein sending the indication comprises:
in response to the number of times being smaller than the predetermined threshold, sending the indication to the second device.
6. The method according to claim 1, wherein the resource includes a frequency resource in a subframe.
7. The method according to claim 1, wherein the first device disables a data reception function.
8. The method according to claim 1, wherein the first device is user equipment, and the second device is vehicle equipment.
9. A communication method, comprising:
receiving, at a second device and from a first device transmitting data using a resource randomly selected from a resource pool, an indication that the first device will continue to use the resource for transmitting further data; and
selecting, based on the indication, a resource for data transmission of the second device;
wherein the indication that the resource will continue to be used is determined based on comparing a number of times the resource was used for data transmission with a predetermined threshold.

10. The method according to claim 9, wherein the resource for data transmission includes a frequency resource in a subframe.

11. The method according to claim 9, wherein the first device is user equipment, and the second device is vehicle equipment.

12. An electronic device, comprising:
a controller configured to randomly select a resource for data transmission from a resource pool;
a transceiver configured to:
  transmit data using the resource; and
  send, to a further electronic device, an indication that the electronic device will continue to use the resource for transmitting further data;
wherein the electronic device is configured to compare a number of times the resource is being used for data transmission with a predetermined threshold.

13. The electronic device according to claim 12, wherein the controller is further configured to:
compare the number of times of the resource being used for data transmission with a predetermined threshold.

14. An electronic device, comprising:
a transceiver configured to receive, from a further electronic device transmitting data using a resource randomly selected from a resource pool, an indication that the further electronic device will continue to use the resource for transmitting further data; and
a controller configured to select, based on the indication, a resource for data transmission of the electronic device;
wherein the indication that the resource will continue to be used is determined based on comparing a number of times the resource was used for data transmission with a predetermined threshold.

* * * * *